(12) United States Patent
Huang et al.

(10) Patent No.: US 7,929,729 B2
(45) Date of Patent: Apr. 19, 2011

(54) IMAGE PROCESSING METHODS

(75) Inventors: Yea-Shuan Huang, Zhugong Town (TW); Hao-Ying Cheng, Hsinchu (TW); Po-Feng Cheng, Kaohsiung (TW); Shih-Chun Wang, Dahua Village (TW)

(73) Assignee: Industrial Technology Research Institute, Hsinchu (TW)

( * ) Notice: Subject to any disclaimer, the term of this patent is extended or adjusted under 35 U.S.C. 154(b) by 1051 days.

(21) Appl. No.: 11/695,573

(22) Filed: Apr. 2, 2007

(65) Prior Publication Data

US 2008/0240500 A1     Oct. 2, 2008

(51) Int. Cl.
  *G06K 9/00*   (2006.01)
  *G06K 9/46*   (2006.01)
(52) U.S. Cl. .................. 382/103; 382/190; 382/236
(58) Field of Classification Search .......... 382/103, 382/236, 107, 218, 224–225, 190; 348/155
  See application file for complete search history.

(56) References Cited

U.S. PATENT DOCUMENTS

| | | | |
|---|---|---|---|
| 6,950,123 B2 | 9/2005 | Martins | |
| 6,985,172 B1 * | 1/2006 | Rigney et al. | 348/149 |
| 7,035,430 B2 | 4/2006 | Ito | |
| 7,110,569 B2 * | 9/2006 | Brodsky et al. | 382/103 |
| 7,227,893 B1 * | 6/2007 | Srinivasa et al. | 375/240.08 |
| 7,280,673 B2 * | 10/2007 | Buehler et al. | 382/103 |
| 7,787,011 B2 * | 8/2010 | Zhou et al. | 348/143 |
| 2004/0156530 A1 | 8/2004 | Brodsky | |
| 2005/0276446 A1 * | 12/2005 | Chen et al. | 382/103 |
| 2008/0181453 A1 * | 7/2008 | Xu et al. | 382/103 |

OTHER PUBLICATIONS

Jürgen Stauder, "Detection of Moving Cast Shadows for Object Segmentation", IEEE Transactions on MultiMedia, vol., No. 1, pp. 65-75, (Mar. 1999).
Rita Cucchiara, "Improving Shadow Suppression in Moving Object Detection with HSV Color Information", 2001 IEEE Intelligent Transportation Systems Conference Proceedings, Oakland (CA) USA, pp. 334-339, (Aug. 25-29, 2001).
Ivana Mikie, "Moving Shadow and Object Detection in Traffic Scenes", Department of Electrical and Computer Engineering, University of California, San Diego, USA, pp. 321-324, (IEEE 2000).

(Continued)

*Primary Examiner* — Daniel G Mariam
(74) *Attorney, Agent, or Firm* — Alston & Bird LLP (57) ABSTRACT

A method of image processing, the method comprising receiving an image frame including a plurality of pixels, each of the plurality of pixels including an image information, conducting a first extraction based on the image information to identify foreground pixels related to a foreground object in the image frame and background pixels related to a background of the image frame, scanning the image frame in regions, identifying whether each of the regions includes a sufficient number of foreground pixels, identifying whether each of regions including a sufficient number of foreground pixels includes a foreground object, clustering regions including a foreground object into at least one group, each of the at least one group corresponding to a different foreground object in the image frame, and conducting a second extraction for each of at least one group to identify whether a foreground pixel in the each of the at least one group is to be converted to a background pixel.

25 Claims, 10 Drawing Sheets

OTHER PUBLICATIONS

Sohail Nadimi, "Physical Models for Moving Shadow and Object Detection in Video", IEEE Transactions on Pattern Analysis and Machine Intelligence, vol. 26, No. 8, pp. 1079-1087, (Aug. 2004), Published by the IEEE Computer Society.

Robert T. Collins, "A System for Video Surveillance and Monitoring", tech. report CMU-RI-TR-00-12, Robotics Institute, Carnegie Mellon University, Pittsburgh, PA, pp. 1-15, (May 2000).

Yasuyuki Matsushita, "Shadow Elimination for Robust Video Surveillance", Proceedings of the Workshop on Motion and Video Computing (MOT1ON'O2), Institute of Industrial Science, The Univ. of Tokyo and supported by Japan Science and Technology, pp. 15-21, (Dec. 5-6, 2002).

Anderson et al., *Change Detection and Tracking Using Pyramid Transformation Techniques*, SPIE Intelligent Robics and Computer Vision, vol. 579, 1985, pp. 72-78.

Freund, Y., et al., *Experiments With a New Boosting Algorithm*, International Conference on Machine Learning, 1996, pp. 148-156.

Huang, J., et al., *Face Pose Discrimination Using Support Vector Machines (SVM)*, Proceeding of International Conference Pattern Recognition, Brisband, Queensland, Australia, 1998.

Haykin, S., *Neural Networks: A Comprehensive Foundation*, Second Edition, Prentice Hall, 1999, pp. 256-305.

\* cited by examiner

IMAGE PROCESSING METHODS

BACKGROUND OF THE INVENTION

The present invention relates generally to image processing, and, more particularly, to video surveillance applications and methods of extracting a foreground object from a background image.

Image processing methods have various applications, many of which may be applied to applications such as video surveillance and other security-related purposes. Taking video surveillance as an example, closed-loop video monitoring systems have been used for security-related purposes over the past few decades. However, these systems may be limited to recording images in places of interest, and do not support analysis of objects or events. With the development and advancement in digital video and automatic intelligence techniques, intelligent monitoring systems based on computer vision have become popular in the security field. For example, intelligent surveillance systems may be deployed in airports, metro stations, banks or hotels for identifying terrorists or crime suspects. An intelligent monitoring system may refer to one capable of automatically analyzing images taken by cameras without manual operation for identifying and tracking mobile objects such as people, vehicles, animals or articles. In analyzing the images, it may be helpful or necessary to distinguish a foreground object from a background image to enable or simplify subsequent analysis of the foreground object.

Conventional techniques for extracting foreground objects may include background subtraction, temporal differencing and optical flow. The background subtraction approach may include a learning phase and a testing phase. During the learning phase, a plurality of pictures free of foreground objects may be collected and used as a basis to establish a background model. Pixels of the background model may generally be described in a simple Gaussian Model or Gaussian Mixture Model. In general, a smaller Gaussian model value may be assigned to a pixel that exhibits a greater difference in color or grayscale level from the background image, while a greater Gaussian model value may be assigned to a pixel that exhibits a smaller difference in color or grayscale level from the background image. An example of the background subtraction approach can be found in "A System for Video Surveillance and Monitoring" by Collins et al, Tech. Rep., The Robotics Institute, Carnegie Mellon University, 2000. In certain applications, the background subtraction approach may be disadvantageous in extracting foreground objects that may have a color closer to that of background. Furthermore, a shadow image may be incorrectly identified as a foreground object in some applications, and the change in hue may adversely affect the extraction sometimes. Consequently, the resultant picture extraction may be relatively broken or even unrecognizable.

As to the temporal differencing approach, it may directly subtract pictures taken at different timings. A pixel may be identified as a foreground pixel of a foreground object if the absolute value of a difference at the pixel point between the pictures exceeds a threshold. Otherwise, the pixel may be identified as a background pixel. An example of the temporal differencing approach may be found in "Change Detection and Tracking Using Pyramid Transformation Techniques" by Anderson et al, In Proc. of SPIE Intelligent Robics and Computer Vision, Vol. 579, pp. 72-78, 1985. Depending on its applications, the temporal differencing approach may be disadvantageous in extracting foreground objects that may be immobilized or move relatively slowly across the background. In general, local areas having boundaries or lines of a foreground object may be easily extracted. Block images of a foreground object without significant change in color, for example, the close-up of clothing, pants or faces, however, may be incorrectly identified as background images in some applications.

The optical flow approach, based on the theory that optical flow changes when a foreground object moves into background, may calculate the amount of displacement between frames for each pixel of an image of a moving object, and determine the position of the moving object. An example of the optical flow approach may be found in U.S. Published patent Application No. 20040156530 by Brodsky et al., entitled "Linking tracked Objects that Undergo Temporary Occlusion." In some examples, the optical flow approach may involve a relatively high amount of computation and may not support real-time image processing.

Therefore, it may be desirable to have image processing methods that may alleviate some or all of the disadvantages of the conventional approaches. In some applications, it may also be desirable to have methods that may extract a foreground object in multiple stages and update a background model in order to enhance the extraction ability.

BRIEF SUMMARY OF THE INVENTION

Examples of the present invention may provide a method of image processing, the method comprising receiving an image frame including a plurality of pixels, each of the plurality of pixels including an image information, conducting a first extraction based on the image information to identify foreground pixels related to a foreground object in the image frame and background pixels related to a background of the image frame, scanning the image frame in regions, identifying whether each of the regions includes a sufficient number of foreground pixels, identifying whether each of regions including a sufficient number of foreground pixels includes a foreground object, clustering regions including a foreground object into at least one group, each of the at least one group corresponding to a different foreground object in the image frame, and conducting a second extraction for each of at least one group to identify whether a foreground pixel in the each of the at least one group is to be converted to a background pixel.

Some examples of the present invention may also provide a method of image processing, the method comprising receiving an image frame including a plurality of pixels, conducting a first extraction to identify foreground pixels related to a foreground object in the image frame and background pixels related to a background of the image frame, scanning the image frame in regions, identifying whether each of the regions includes a sufficient number of foreground pixels, identifying whether at least one of regions including a sufficient number of foreground pixels includes a foreground object, identifying one of the at least one region including a foreground object as a seed region, clustering the seed region and one of the at least one region into a group if an overlap between the seed region and the one of the at least one region is greater than a threshold, and conducting a second extraction for the group to identify whether a foreground pixel in the group is to be converted to a background pixel.

Examples of the present invention may further provide a method of image processing, the method comprising receiving an image frame including a plurality of pixels, conducting a first background subtraction to identify foreground pixels related to a foreground object in the image frame and background pixels related to a background of the image frame, identifying whether a region of the image frame includes a sufficient number of foreground pixels, identifying whether a region including a sufficient number of foreground pixels includes a foreground object, identifying whether in at least one region including a foreground object, a first region and a second region include the same foreground object, clustering the first region and the second region including the same foreground object into a group, and conducting a second background subtraction for the group to identify whether a foreground pixel in the group is to be converted to a background pixel.

Additional features and advantages of the present invention will be set forth in part in the description which follows, and in part will be obvious from the description, or may be learned by practice of the invention. The features and advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, there are shown in the drawings examples which are presently preferred. It should be understood, however, that the invention is not limited to the precise arrangements and instrumentalities shown.

In the drawings.

DETAILED DESCRIPTION OF THE INVENTION

Reference will now be made in detail to the present examples of the invention, examples of which are illustrated in the accompanying drawings. Wherever possible, the same reference numbers will be used throughout the drawings to refer to the same or like parts.

Figure 1A:
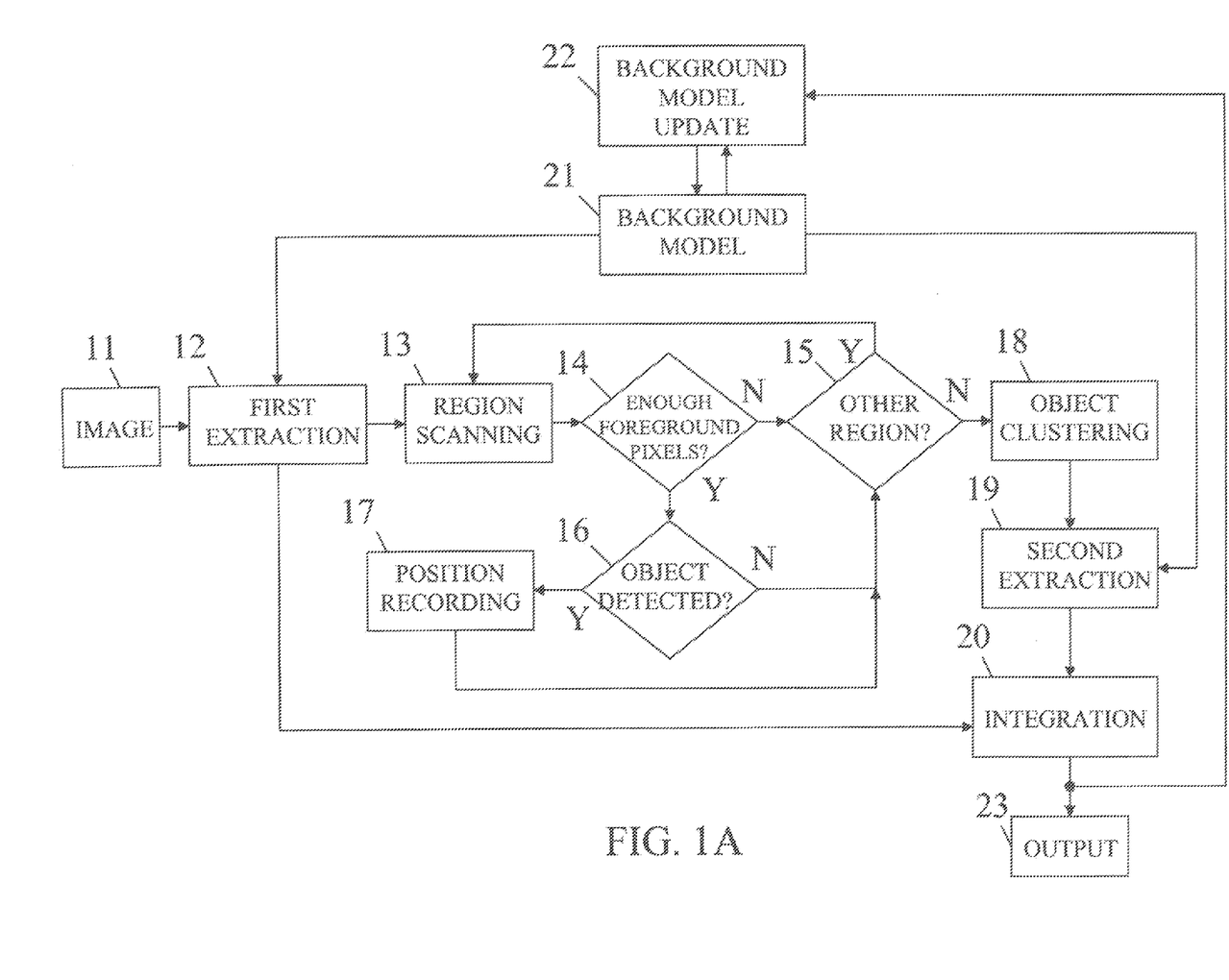
FIG. 1A is a flow diagram illustrating a method of foreground object extraction consistent with an example of the present invention.

FIG. 1A is a flow diagram illustrating a method of foreground object extraction consistent with an example of the present invention. Referring to FIG. 1A, at step 11, image information corresponding to an image frame is received. The image may include, for example, a still image or a moving image, which may further include a plurality of pixels. The image information may include a feature value such as a color value or a grayscale value of a pixel. At step 12, a first extraction may be conducted across the image frame to detect pixels of a background image (hereinafter "the background pixels") and pixels of one or more foreground object (hereinafter "the foreground pixels.") To implement the first extraction, a conventional technique such as the background subtraction approach, the temporal differencing approach or other suitable approach may be used. As an example of the background subtraction approach, a model for identifying background pixels and foreground pixels may de defined as follows.

$$D(P) = \begin{cases} 1, & \text{if } |I(P) - B(P)| \geq T1; \\ 0, & \text{otherwise.} \end{cases} \quad \text{(Equation 1)}$$

Wherein I(P) refers to a feature value, such as, for example, a color or grayscale value, of a P-th pixel in an image frame, B(P) refers to a feature value of the P-th pixel in a background model, and T1 may represent a first threshold. The background model may be established at step 21 by collecting a plurality of images or pictures free of foreground objects during the learning phase of the background subtraction approach. The first threshold T1 may be predetermined. According to the above Equation 1, if the absolute difference between I(P) and B(P) is equal to or greater than T1, the pixel P is identified as a foreground pixel. Otherwise, the pixel P is identified as a background pixel. In one example, in the case of D(P)=1, it may be further determined whether the pixel identified as a foreground pixel may belong to a shadow of an object by, for example, a conventional shadow detection technique or other suitable technique. If the detection reveals that the pixel belongs to a shadow, the status of the pixel may be changed from a foreground pixel to a background pixel.

Figure 1B:
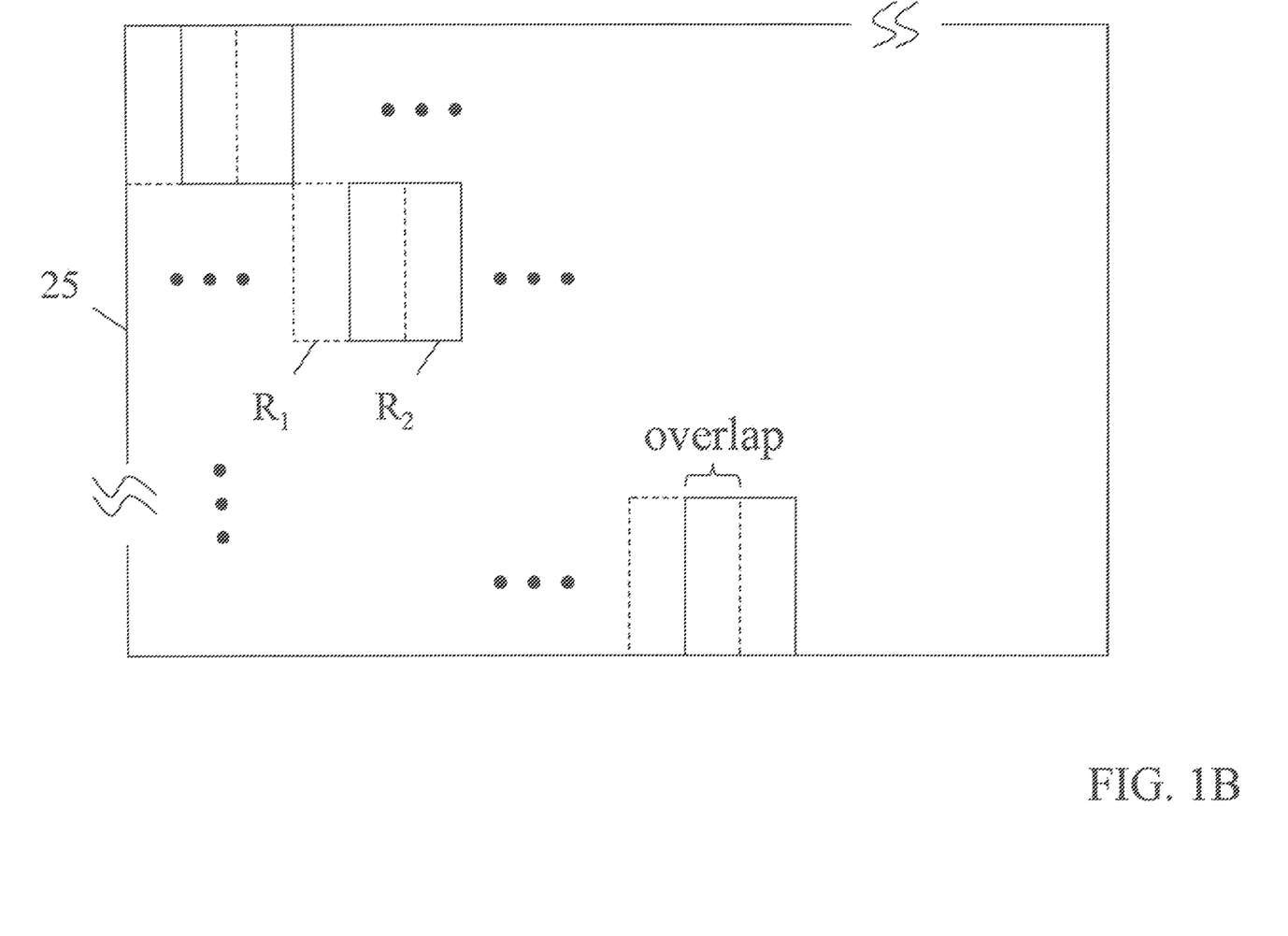
FIG. 1B is an exemplary diagram illustrating a method of region scanning.

Next, at step 13, the image frame may be scanned in regions to identify in each of the regions the number of foreground pixels contained therein, which are identified at the step 12. The image frame may be scanned horizontally from left to right or vertically from top to down one region after another. FIG. 1B is an exemplary diagram illustrating a method of region scanning. Referring to FIG. 1B, an image frame 25 may be scanned in regions horizontally from left to right. In one example, the image frame 25 may have a size of 320 pixels×240 pixels, while a region may have a size of 16 pixels×32 pixels. Furthermore, a region being scanned, such as region $R_2$, may overlap a previously scanned region $R_1$ by a predetermined number of pixels, for example, 2 pixels, along the scanning direction.

Figure 1C:
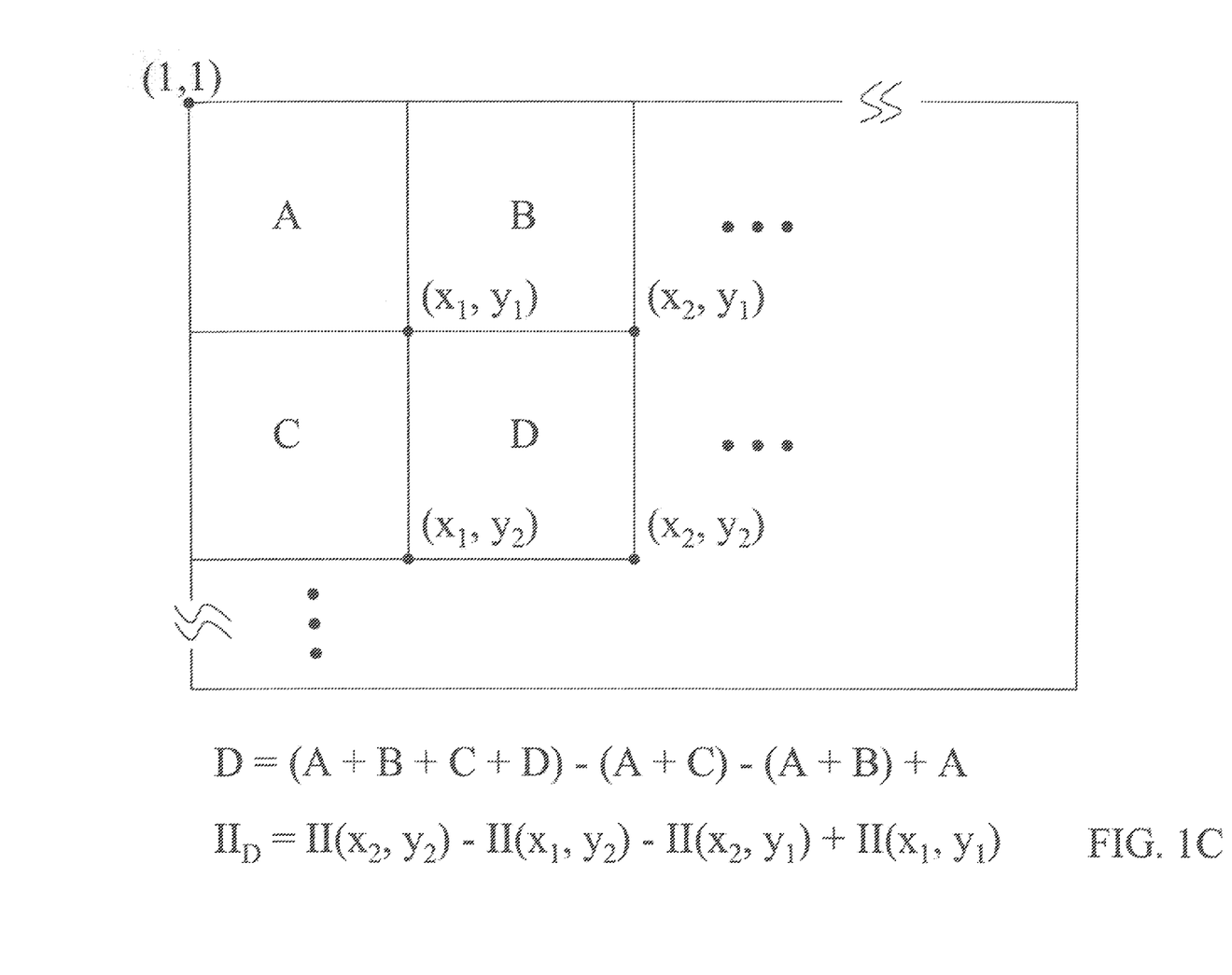
FIG. 1C is an exemplary diagram illustrating scanned regions of an image frame.

FIG. 1C is an exemplary diagram illustrating scanned regions of an image frame. Referring to FIG. 1C, the image frame may include scanned regions A, B, C and D. To calculate the number of foreground pixels in each of the regions A, B, C and D, in one example, an "integral image" method may be employed. The integral image method may include an iterative operation given below.

$$H(x, y) = \sum_{1 \leq a \leq x} \sum_{1 \leq b \leq y} f(a, b)$$

-continued $$s(x, y) = s(x, y - 1) + f(x, y)$$

$$II(x, y) = II(x - 1, y) + s(x, y)$$

$$s(x, 0) = 0; \text{ and } II(0, y) = 0$$

Wherein f(x, y) may represent a pixel value D(P), which may be determined by the above Equation 1, of a pixel at a point (x, y) in an image plane including M×N pixels, where $1 \leq x \leq M$, and $1 \leq y \leq N$, M, N being integers, and II(x, y) may represent a summation of pixel values in a region defined by a point (1, 1) at the most upper left corner and the point (x, y) at a lower right corner of the image plane. In the example illustrated in FIG. 1B, the region A may be defined by the point (1, 1) and a point ($x_1$, $y_1$). A region (A+B) may be defined by the point (1, 1) and a point ($x_2$, $y_1$). A region (A+C) may be defined by the point (1, 1) and a point ($x_1$, $y_2$). Furthermore, a region (A+B+C+D) may be defined by the point (1, 1) and a point ($x_2$, $y_2$). Accordingly, the region B may be represented by (A+B)−A. The region C may be represented by (A+C)−C. Moreover, the region D may be represented by (A+B+C+D)−(A+B)−(A+C)+A.

The number of foreground pixels in the region A may be determined by the value of II($x_1$, $y_1$). Likewise, the number of foreground pixels in the region B may be determined by the value of (II($x_2$, $y_1$)−II($x_1$, $y_1$)). The number of foreground pixels in the region C may be determined by the value of (II($x_1$, $y_2$)−II($x_1$, $y_1$)). Furthermore, the number of foreground pixels in the region D may be determined by the value of (II($x_2$, $y_2$)−II($x_2$, $y_1$)−II($x_1$, $y_2$)+II($x_1$, $y_1$)).

Referring back to FIG. 1A, once a region of the image frame is scanned, at step 14, it may be identified whether there are enough foreground pixels in the scanned region. In one example according to the present invention, the ratio of the number of foreground pixels in a scanned region to the region size in pixels may be compared with a second threshold. If the ratio is greater than or equal to the second threshold, it may then be determined that there are enough foreground pixels in the scanned region. If there are not enough foreground pixels, at step 15, it may be determined whether there is another region to scan in the image frame. The steps 13, 14 and 15 may repeat till all of the regions of the image frame are scanned.

If it is identified at step 14 that there are enough foreground pixels in a scanned region, at step 16, it may then be identified whether the foreground pixels include an object of interest. In one example, a boosting algorithm such as an Adaboost algorithm may be used for object detection. Reference of the Adaboost algorithm may be made to "Experiments with a new boosting algorithm" by Y. Freund et al, International Conference on Machine Learning, pp. 148 to 156, 1996. Adaboost may refer to a sequential forward search procedure using the greedy selection strategy, and may include a procedure that iteratively refines results in multiple stages. Adaboost has been used in, such as, for example, face detection and vehicle recognition. As an example of the human face detection, Adaboost may provide a cascaded architecture for learning and detecting faces, and allow for rejection thresholds.

In another example, a support vector machine (SVM) algorithm may be used to identify whether the foreground pixels may include an object of interest. SVM may include a class of learning algorithm for classification/regression that may be particularly useful for high dimensional input data with either large or small training sets. Reference of the SVM may be made to "Face pose discrimination using support vector machines (SVM)" by J. Huang, X Shao, and H. Wechsler, In Proceedings of International Conference Pattern Recognition, Brisbane, Queensland, Australia, 1998.

In still another example, a neural network may be used to identify whether the foreground pixels may include an object of interest at step 15. The neural network may include a radial basis function (RBF), a generalized radial basis function (GRBF), or other format of a neural network. Such a neural network has been described by, for example, Haykin, S., "Neural Networks: A Comprehensive Foundation", Second Edition, Prentice Hall, 1999.

If it is identified at step 16 that a scanned region may include an object of interest, such a scanned region may be referred to as a "candidate region." In one example, a score may be assigned to a candidate region. The greater the score, the more likelihood that a candidate region may include a foreground object. The position of a candidate region may be recorded at step 17. For example, referring to FIG. 1C, if the regions A and D are identified as candidate regions, the points (1, 1) and ($x_2$, $y_2$), which may respectively serve as the positions of the candidate regions A and D, are recorded. If the detection at step 16 shows no sign of object of interest, the steps 13, 14 and 15 are repeated.

Figure 1D:
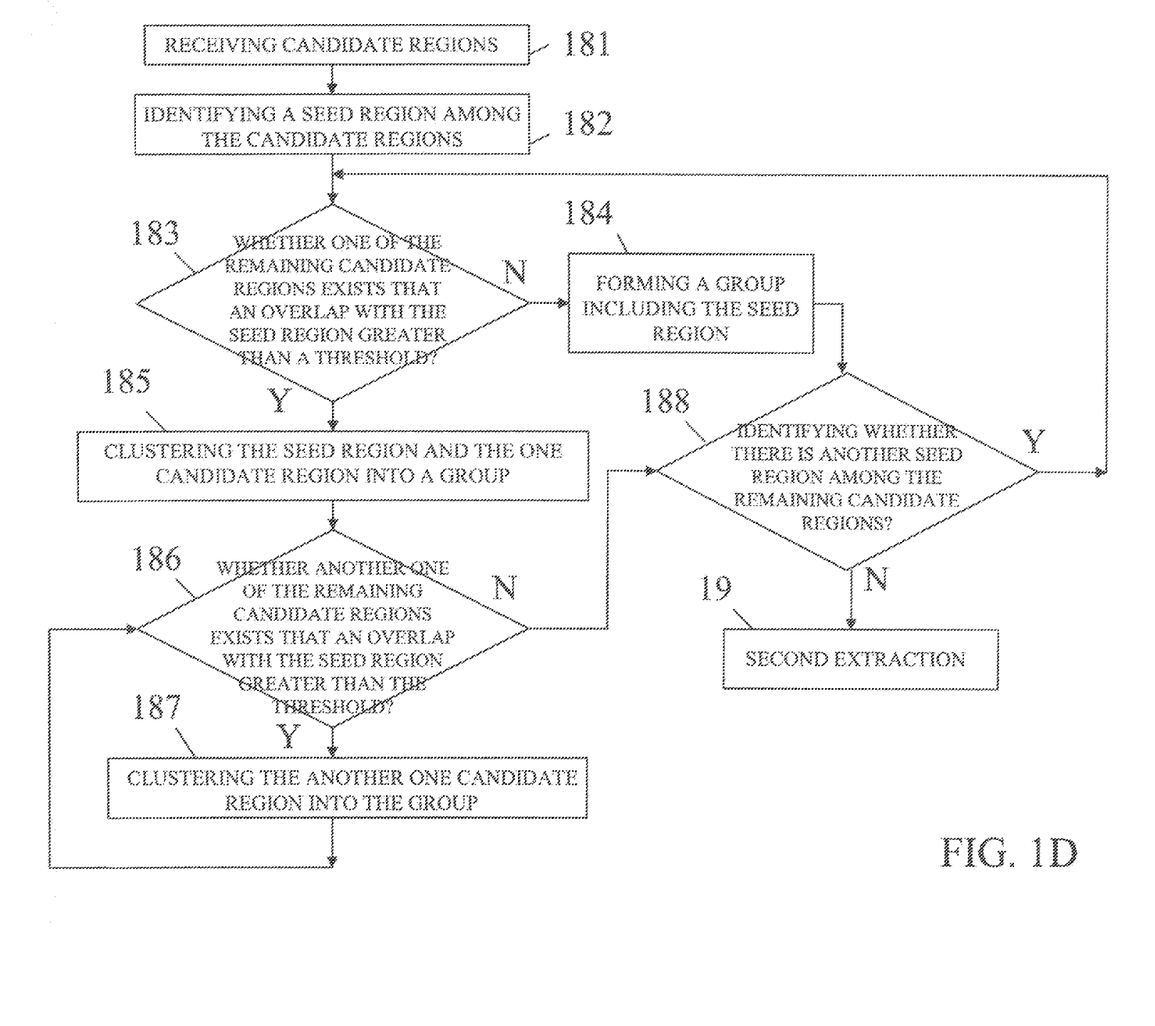
FIG. 1D is a flow diagram illustrating a method of object clustering consistent with an example of the present invention.

Next, after the positions of all detected candidate regions are recorded, at step 18, object clustering may be performed to cluster candidate regions into one or more group. FIG. 1D is a flow diagram illustrating a method of object clustering consistent with an example of the present invention. Referring to FIG. 1D, at step 181, candidate regions identified at step 16 are received. Next, a seed region among the candidate regions may be identified at step 182. In one example, a candidate region that has the maximum score may be selected as a seed region. If more than one candidate regions have the maximum score, any of the more than one candidate regions may be used as a seed region.

Next, at step 183, it may be identified whether one of the remaining candidate regions exists that an overlap between the seed region and the one candidate region is greater than or equal to a threshold. If confirmative, the seed region and the one candidate region are clustered into a first group at step 185. At step 186, it may be identified whether another one of the candidate regions exists that an overlap between the seed region and the another one candidate region is greater than or equal to the threshold. If confirmative, the another one candidate region may be clustered into the first group at step 187. Steps 186 and 187 may repeat till all candidate regions having a sufficient overlap with the seed region are clustered into the first group.

If at step 183 it is identified that none of the candidate regions has a sufficient overlap with the seed region, the seed region alone may be clustered into the first group at step 184. Next, it may be identified at step 188 whether there is another seed region among the remaining candidate regions. Furthermore, step 188 may be followed by step 186 when all of the candidate regions having a sufficient overlap with the seed region identified at step 182 are clustered into the first group. If there is another seed region, steps similar to steps 183 to 187 may be performed to cluster all candidate regions having a sufficient overlap with the another seed region into a second group. Steps 183 to 188 may repeat till all of the candidate regions are clustered into groups.

Figure 1E:
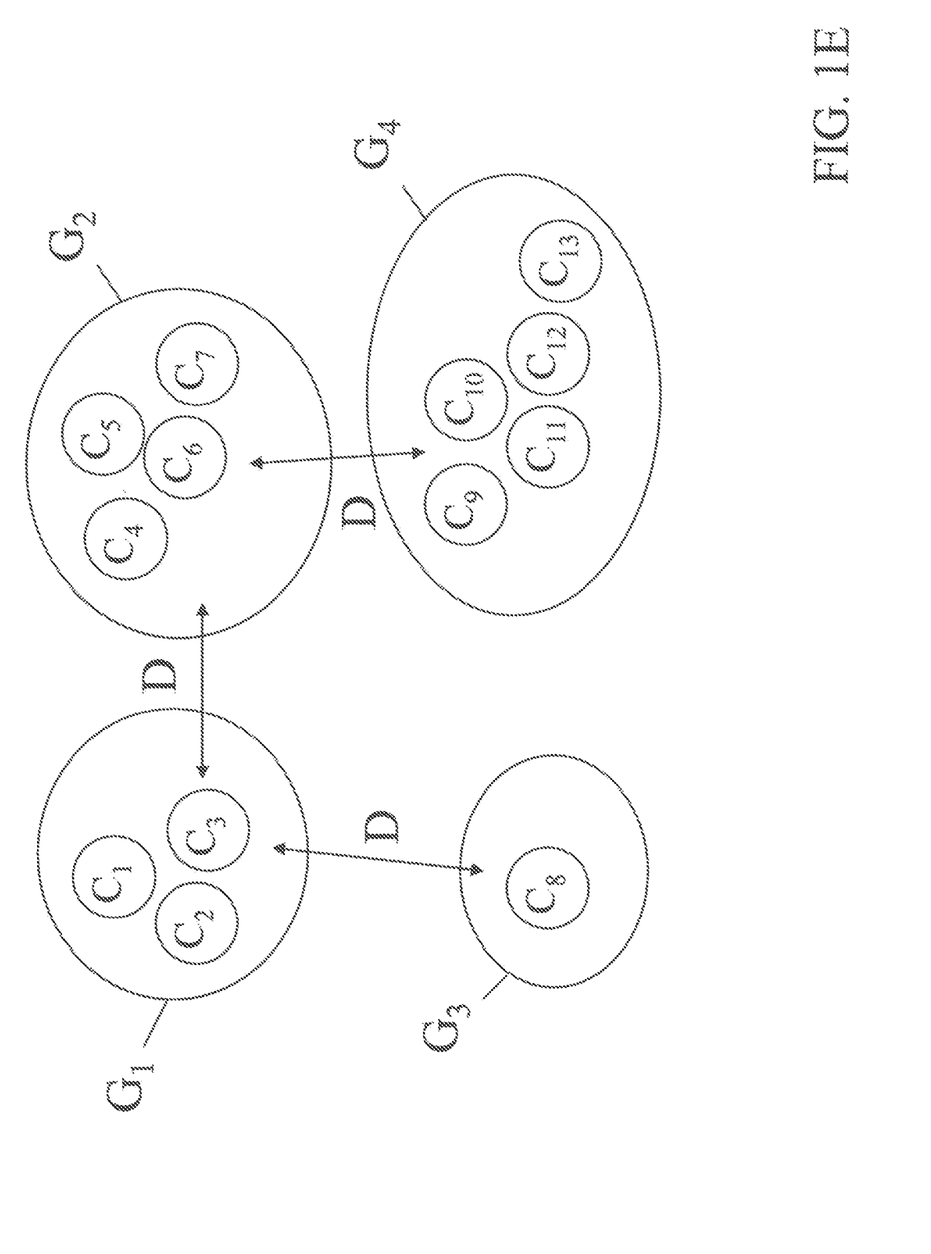
FIG. 1E is a schematic diagram of groups clustered by the method illustrated in FIG. 1D.

FIG. 1E is a schematic diagram of groups clustered by the method illustrated in FIG. 1D. Referring to FIG. 1E, as an example, a total number of thirteen (13) candidate regions $C_1$ to $C_{13}$ are identified at steps 13 to 17. The position and score of each of the candidate regions $C_1$ to $C_{13}$ may have been recorded. During object clustering, also referring to FIG. 1D, a first seed region such as $C_1$ may be identified at step 182. The candidate regions $C_2$ and $C_3$ as well as $C_1$ are clustered into a first group $G_1$ by performing steps 183, 185, 186 and 187. The candidate regions $C_1$ to $C_3$ are clustered together because they have a sufficient overlap with each other and hence may include substantially the same object. In one example according to the present invention, the distance "D" between a seed region and a candidate region may be identified by the positions recorded, and may be used to identify whether there is a sufficient overlap between the seed region and the candidate region.

A second seed region such as $C_4$ may be identified among the remaining candidate regions $C_4$ to $C_{13}$. The candidate regions $C_5$ to $C_7$ as well as $C_4$ are clustered into a second group $G_2$ because they have a sufficient overlap with each other. Next, a third seed region such as $C_8$ among the remaining candidate regions $C_8$ to $C_{13}$ may be selected. However, since none of the candidate regions $C_9$ to $C_{13}$ has a sufficient overlap with the third seed region $C_8$, a third group $G_3$ therefore includes the third seed region $C_8$ alone. Next, a fourth seed region such as $C_9$ may be identified among the remaining candidate regions $C_9$ to $C_{13}$. The candidate regions $C_{10}$ to $C_{13}$ as well as $C_9$ are clustered into a fourth group $G_4$. Each of the groups $G_1$ to $G_4$ may include a foreground object.

Figure 1F:
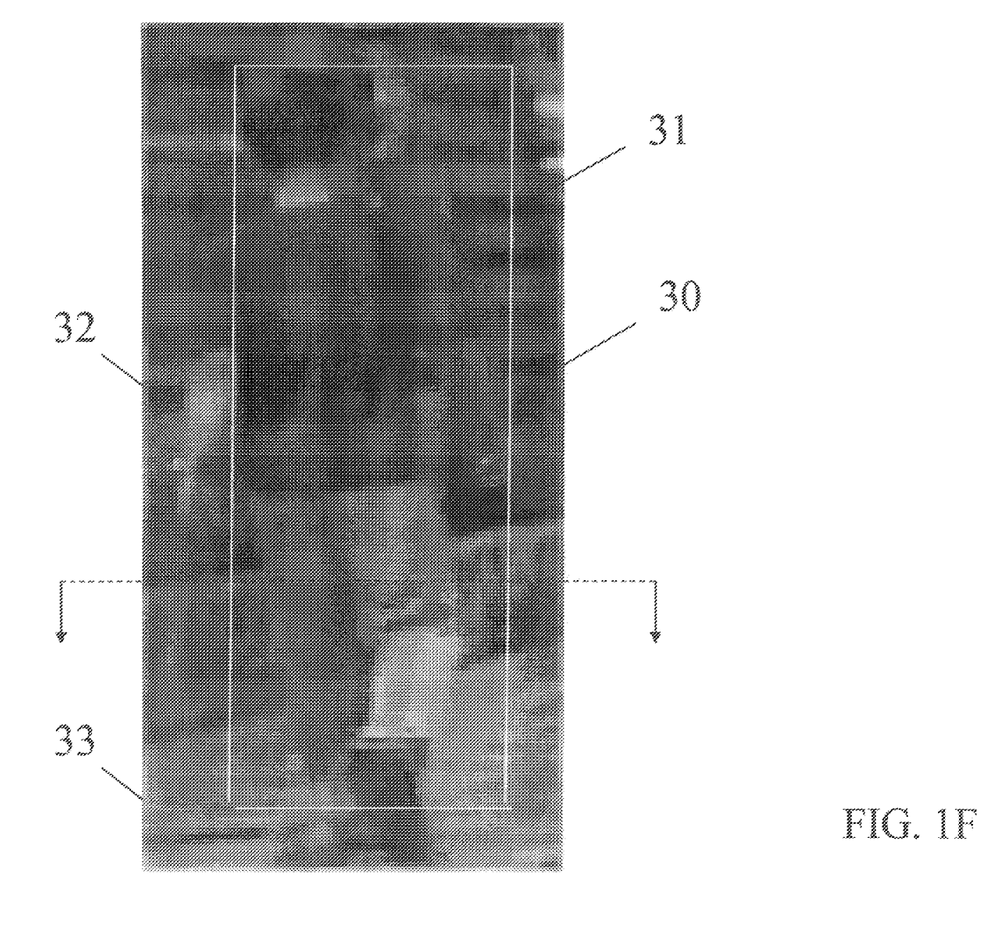
FIG. 1F is an exemplary photo of a group of an image frame.

After the object clustering at step 18, referring back to FIG. 1A, a second extraction may be conducted at step 19. FIG. 1F is an exemplary photo of a group 30 of an image frame after object clustering at step 18. Referring to FIG. 1F, the group 30, which has been identified to include an object, may include a central portion 31 and a boundary portion 32. The central portion 31, which may be enveloped by a box, may be more likely to include an object than the boundary portion 32 outside the box. In other words, the boundary portion 32 may be more likely to include a background image than the central portion 31. Furthermore, a lower portion 33 of the region 30 may be more likely to include a shadow than an upper portion (not numbered). In one example, a conventional technique such as the background subtraction approach, the temporal differencing approach or other suitable approach may be used to conduct the second extraction. As an example of the background subtraction approach, given an image size of 320×240 pixels, the group 30 may have a size ranging from 16×32 to 80×160 pixels, the central portion 31 may have a size of 12×24 pixels, and the lower portion 33 may have a size of 16×8 pixels. Furthermore, in conducting the second extraction using the background subtraction approach, for pixels in the boundary portion 32, the model associated with the Equation 1 may be modified by using a third threshold instead of the first threshold T1. Moreover, for the lower portion 33, a fourth threshold instead of the first threshold may be used. Since the boundary portion 32 may be more likely to include a background portion of the image and the lower portion is more likely to include a shadow of an object, in one example, the fourth threshold is greater than the third threshold, which in turn is greater than the first threshold. In still another example, if a pixel is identified in the first extraction at step 12, the second extraction for the pixel may be eliminated in order to save computation time.

Next, referring back to FIG. 1A, an output of the second extraction may be integrated with an output of the first extraction, resulting in a foreground object for output at step 23. In one example, the integration may be achieved by a logic "OR" operation. Specifically, the feature values of pixels obtained by the first extraction and the second extraction may be "ORed" with one another to result in a foreground object.

At step 22, the result of the second extraction may be used to update the background model established at step 21. An updated feature value B'(P) of the background model in one example may be defined as follows.

$B'(P)=(1-\alpha)B(P)+\alpha I(P)$, if a pixel P is identified as a background pixel and is not located in a region that may include at least a portion of an object; or $B'(P)=(1-\beta)B(P)+\beta I(P)$, if a pixel P is identified as a background pixel and is located in a region that may include at least a portion of an object; or $B'(P)=(1-\gamma)B(P)+\gamma I(P)$, if a pixel P is identified as a foreground pixel.

Wherein I(P) may refer to a feature value, such as, for example, a color or grayscale value, of a P-th pixel in an image, and B(P) may refer to a feature value of the P-th pixel in a background model. In one example, the value of the first parameter, $\alpha$, is greater than that of the second parameter, $\beta$, which in turn is greater than that of the third parameter, $\gamma$. As an example, the values of $\alpha$, $\beta$ and $\gamma$ may be approximately 0.012, 0.004 and 0.001, respectively. The updated background model B'(P) may be applied to a subsequent image during its first and second extraction stages at steps 12 and 19, respectively.

Figure 2A:
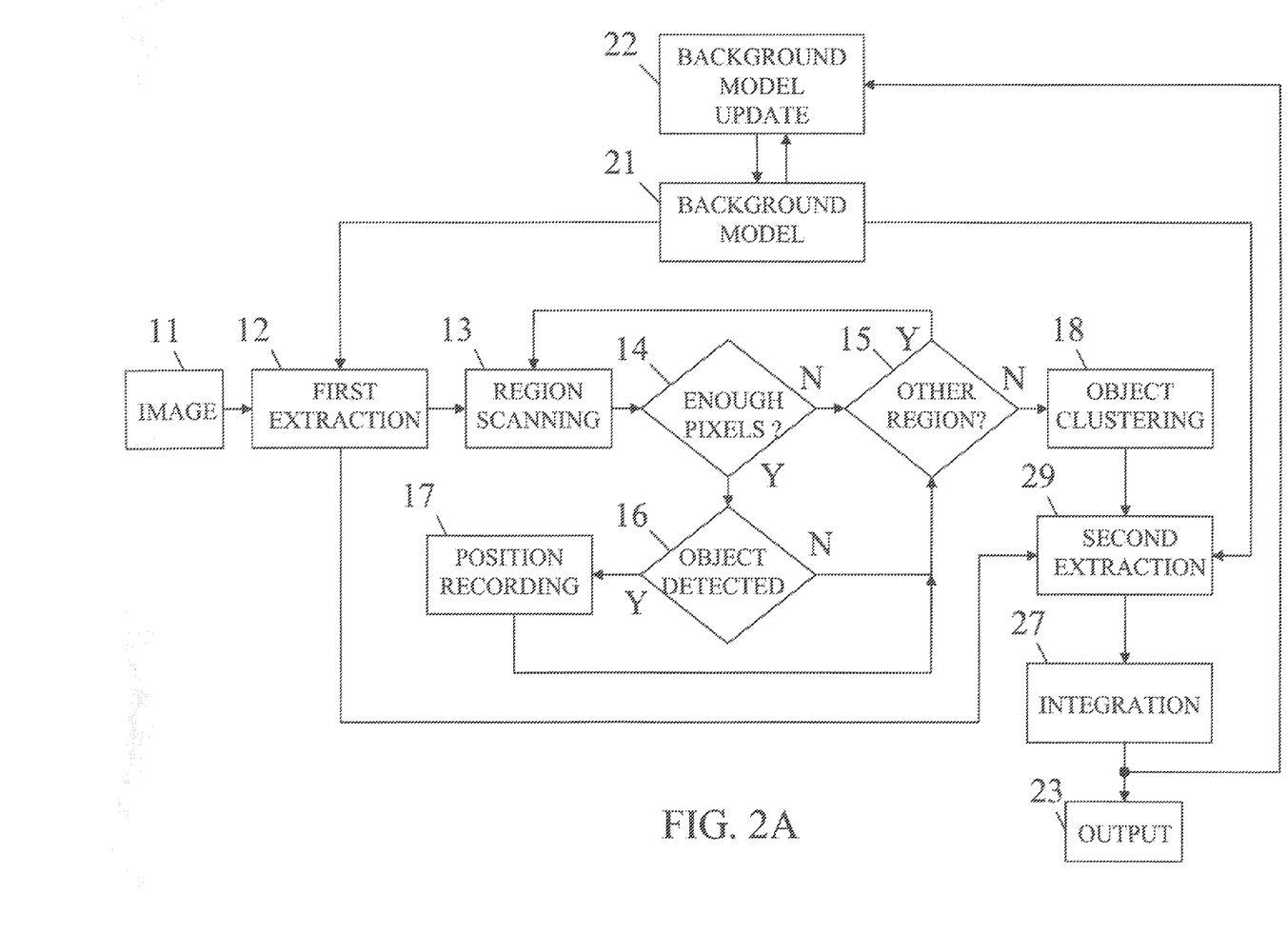
FIG. 2A is a flow diagram illustrating a method of foreground object extraction consistent with another example of the present invention.

FIG. 2A is a flow diagram illustrating a method of foreground object extraction consistent with another example of the present invention. Referring to FIG. 2A, the method may be similar to that illustrated in FIG. 1A except, for example, a step 29 for second extraction. A pixel identified as a foreground pixel at step 12 may on one hand enter step 29 for second extraction, and may on the other hand undergo the steps 13 to 18 before the second extraction. In one example, the results of the first extraction and second extraction at steps 12 and 29, respectively, may be integrated at step 27 by, for example, a logic "OR" operation.

Figure 2B:
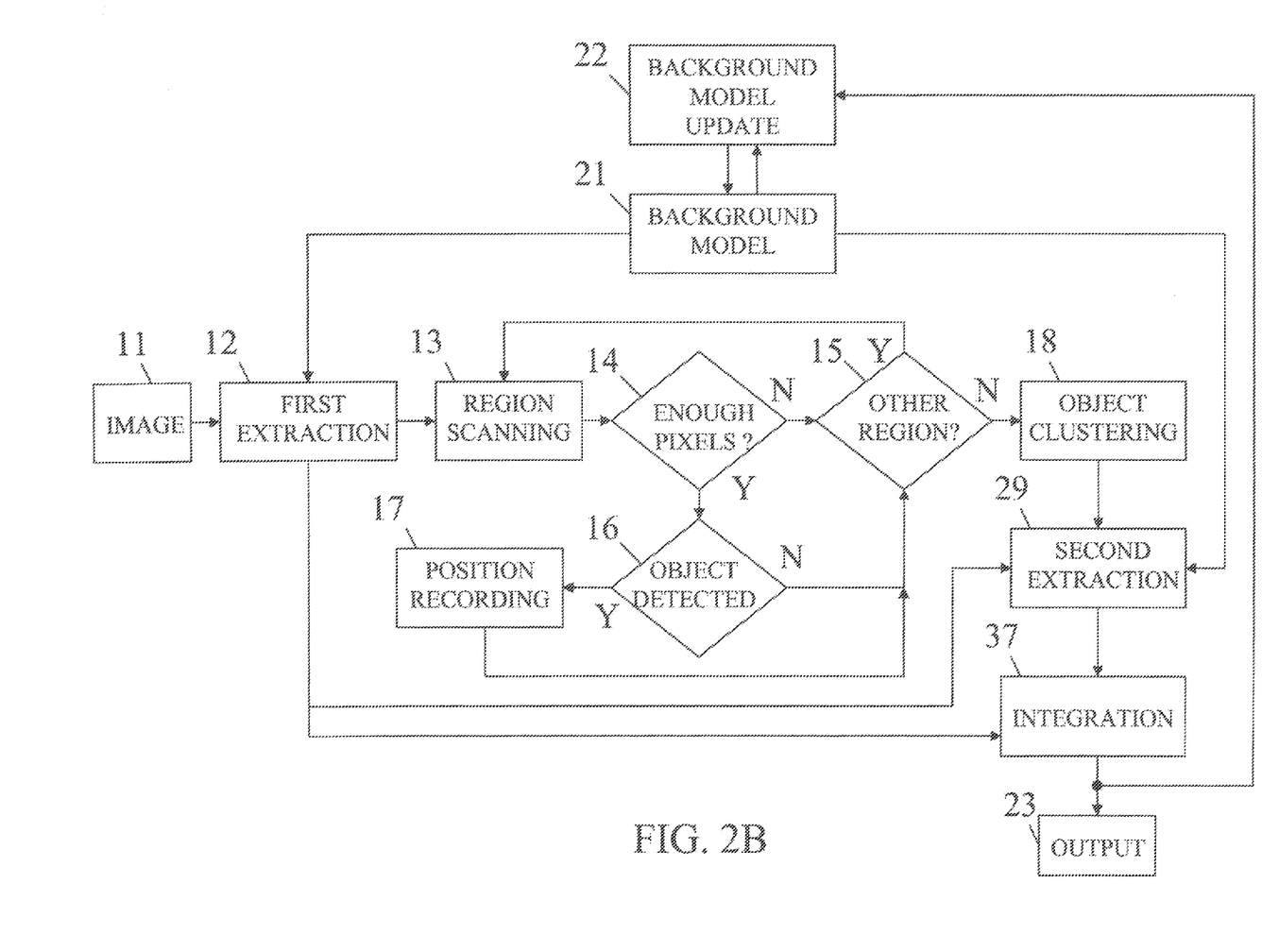
FIG. 2B is a flow diagram illustrating a method of foreground object extraction consistent with still another example of the present invention.

FIG. 2B is a flow diagram illustrating a method of foreground object extraction consistent with still another example of the present invention. Referring to FIG. 2B, the method may be similar to that illustrated in FIG. 2A except, for example, a step 37 for integration. A pixel identified as a foreground pixel at step 12 may on one hand enter step 29 for second extraction, and may on the other hand undergo the steps 13 to 18 before the second extraction. The results of the first extraction and the second extraction may then be integrated with one another at step 37.

Figure 3A:
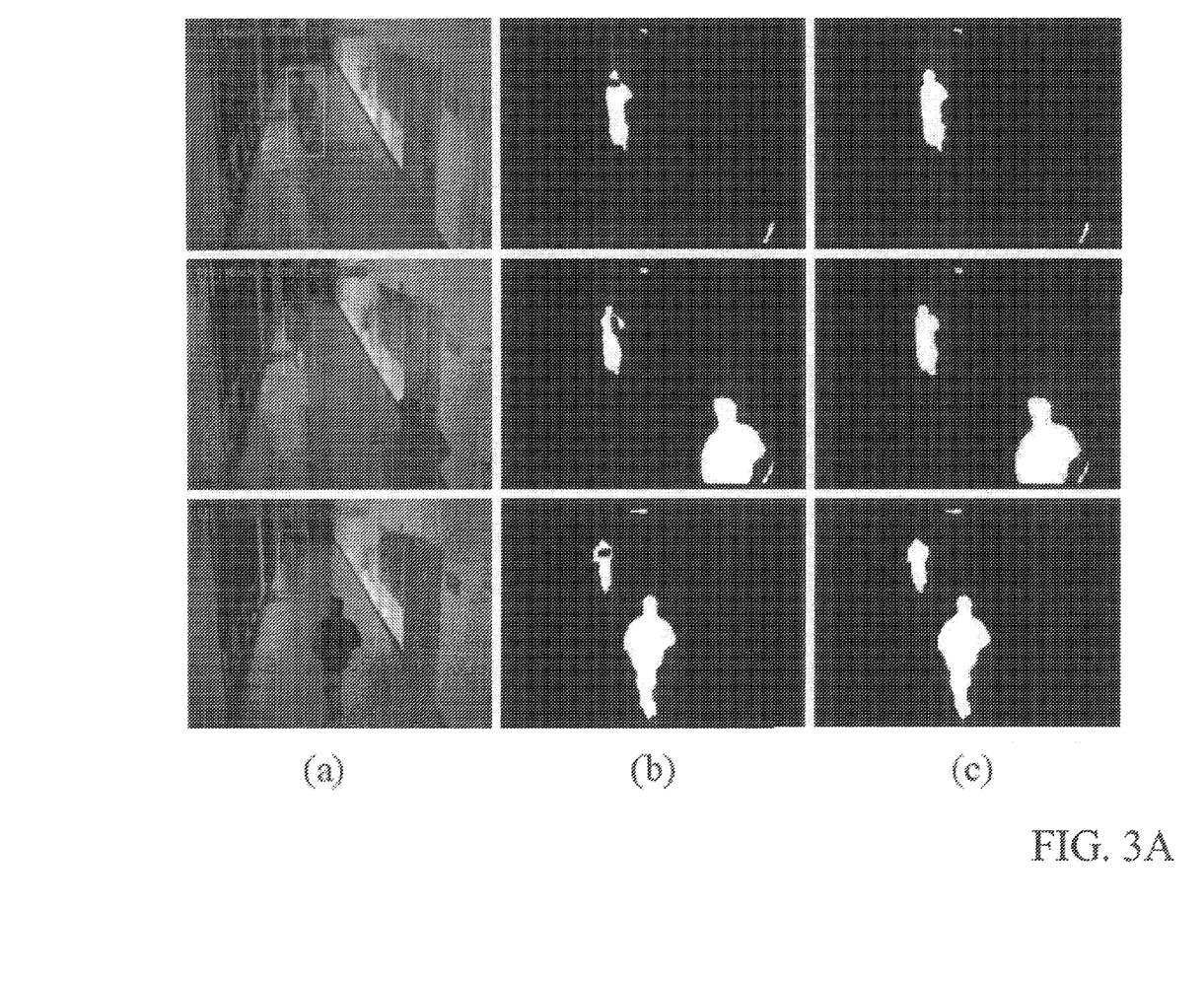
FIGS. 3A and 3B are diagrams illustrating experimental results of a conventional method and a method according to the present invention in comparison.
Figure 3B:
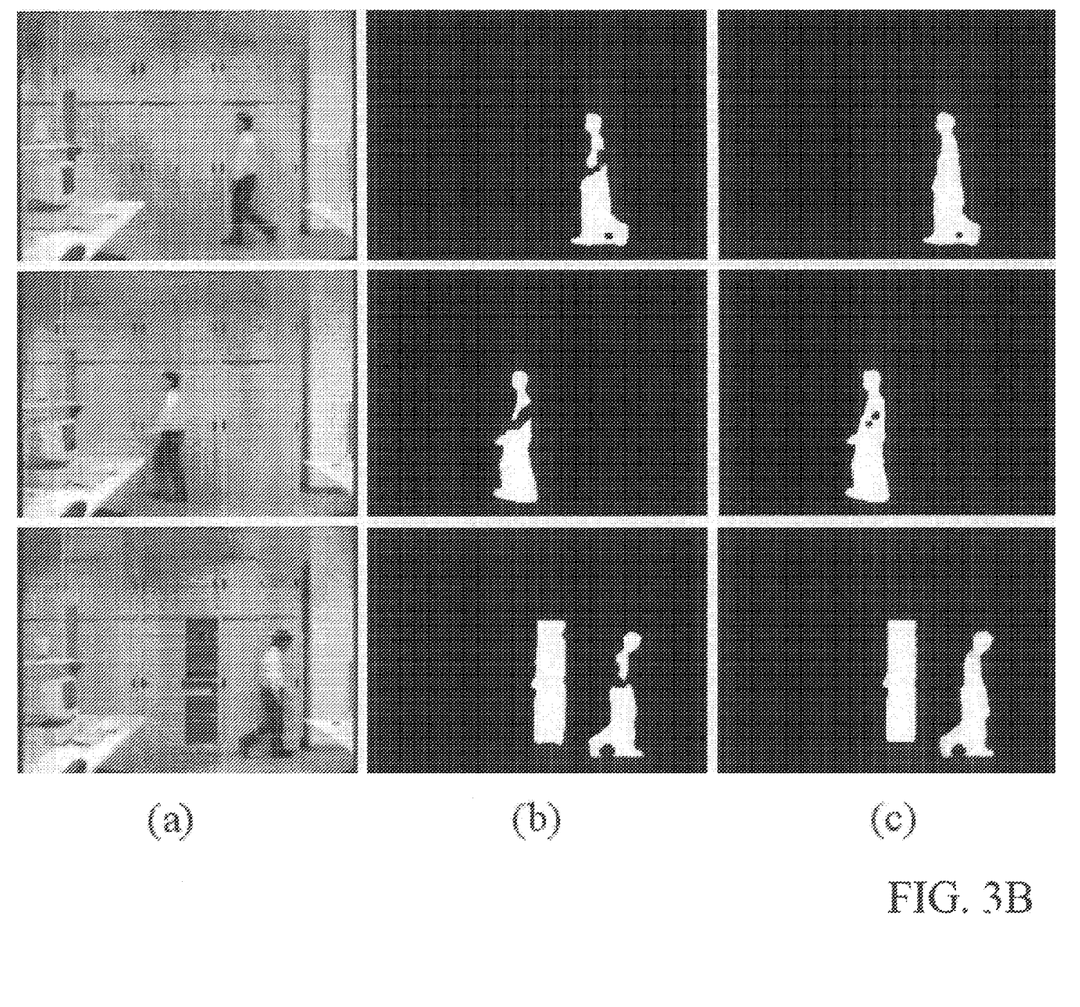

FIGS. 3A and 3B are diagrams illustrating experimental results of a conventional method and a method according to the present invention in comparison. To conduct the experiments, a series of pictures, for example, approximately 150 pictures may be taken, of which approximately 30 pictures free of foreground objects may be used to establish a background model, and the remaining 120 pictures may be used for foreground object extraction. The experiments may be conducted with the help of a computer having a system platform such as Windows 2000XP, and a developer tool such as Visual C++6.0, which may run on a central processing unit (CPU) such as a 2-GHz Pentium M processor associated with a random access memory (RAM) of 512 MB.

Referring to FIG. 3A, with respect to a set of photos illustrated in column (a), the results of foreground object extraction by a conventional background subtraction and a method according to the present invention are illustrated in columns (b) and (c), respectively. The set of photos illustrated in column (b) may be tattered or broken, as compared to those illustrated in column (c).

Referring to FIG. 3B, with respect to a set of photos illustrated in column (a), the results of foreground object extraction by a conventional background subtraction and a method according to the present invention are illustrated in columns (b) and (c), respectively. The set of photos illustrated in column (c) may be tattered or broken, as compared to those illustrated in column (c). In other words, the method according to the present invention may provide an improved extraction quality as compared to the conventional background subtraction method.

It will be appreciated by those skilled in the art that changes could be made to the examples described above without departing from the broad inventive concept thereof. It is understood, therefore, that this invention is not limited to the particular examples disclosed, but it is intended to cover modifications within the spirit and scope of the present invention as defined by the appended claims.

Further, in describing representative examples of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

We claim:

1. A method of image processing, the method comprising:
   receiving an image frame including a plurality of pixels, each of the plurality of pixels including an image information;
   conducting a first extraction based on the image information to identify foreground pixels related to a foreground object in the image frame and background pixels related to a background of the image frame;
   scanning the image frame in regions;
   identifying whether each of the regions includes a sufficient number of foreground pixels;
   identifying whether each of regions including a sufficient number of foreground pixels includes a foreground object;
   clustering regions including a foreground object into at least one group, each of the at least one group corresponding to a different foreground object in the image frame; and
   conducting a second extraction for each of at least one group to identify whether a foreground pixel in the each of the at least one group is to be converted to a background pixel,
   wherein conducting the first extraction comprises applying a first background subtraction technique, and conducting the second extraction comprises applying a second background subtraction technique, and
   wherein each of the at least one group includes a central portion and a boundary portion, further comprising:
   using a third threshold for the central portion in conducting the second extraction; and
   using a fourth threshold for the boundary portion in conducting the second extraction, the fourth threshold being greater than the third threshold.

2. The method of claim 1, wherein conducting the first extraction comprises applying one of a background subtraction technique or a temporal differencing technique.

3. The method of claim 2, wherein conducting the first extraction comprises using a background subtraction technique to identify foreground pixels related to a foreground object in the image frame and background pixels related to a background of the image frame.

4. The method of claim 1, wherein identifying whether each of the regions includes a sufficient number of foreground pixels comprises using an iterative operation.

5. The method of claim 1, wherein identifying whether each of regions including a sufficient number of foreground pixels includes a foreground object comprises using one of an Adaboost algorithm, a support method machine (SVM) algorithm or a neural network.

6. The method of claim 1, wherein conducting the second extraction comprises using one of a background subtraction technique or a temporal differencing technique.

7. The method of claim , wherein the first background subtraction technique uses a first threshold and the second background subtraction technique uses a second threshold.

8. The method of claim 7, wherein the first threshold is greater than the second threshold.

9. The method of claim 1, wherein each of the at least one group includes a central portion and a lower portion, further comprising:
   using a third threshold for the central portion in conducting the second extraction; and
   using a fourth threshold for the boundary portion in conducting the second extraction, the fourth threshold being greater than the third threshold.

10. The method of claim 1, wherein each of the at least one group includes a central portion, a boundary portion and a lower portion, further comprising:
    using a third threshold for the central portion in conducting the second extraction;
    using a fourth threshold for the boundary portion in conducting the second extraction; and
    using a fifth threshold for the lower portion in conducting the second extraction, the fifth threshold being greater than the fourth threshold, and the fourth threshold being greater than the third threshold.

11. The method of claim 1 further comprising assigning a score to each of the regions including a foreground object.

12. The method of claim 1 further comprising recording a position of each of the regions including foreground object.

13. The method of claim 1, wherein clustering regions including a foreground object into at least one group comprises:
    identifying one of the regions including a foreground object as a seed region;
    identifying whether an overlap between the seed region and one of the remaining regions is greater than a predetermined value; and
    clustering the seed region and the one of the remaining region into a group if the overlap is greater than the predetermined value.

14. A method of image processing, the method comprising:
    receiving an image frame including a plurality of pixels;
    conducting a first extraction to identify foreground pixels related to a foreground object in the image frame and background pixels related to a background of the image frame;
    scanning the image frame in regions;
    identifying whether each of the regions includes a sufficient number of foreground pixels;
    identifying whether at least one of regions including a sufficient number of foreground pixel includes a foreground object;
    identifying one of the at least one region including a foreground object as a seed region;

clustering the seed region and one of the at least one region into a group if an overlap between the seed region and the one of the at least one region is greater than a threshold; and conducting a second extraction for the group to identify whether a foreground pixel in the group is to be converted to a background pixel in response to overlap between the seed region and the one of the at least one region being equal to or less than the threshold, wherein conducting the first extraction comprises using a first background subtraction technique, and conducting the second extraction using a second background subtraction technique, and wherein the group includes a central portion and a boundary portion, further comprising:
using a third threshold for the central portion in conducting the second extraction; and
using a fourth threshold for the boundary portion in conducting the second extraction, the fourth threshold being greater than the third threshold.

15. The method of claim 14 further comprising performing a logic OR operation for foreground pixels obtained by the first extraction and the second extraction.

16. The method of claim 14, wherein the first background subtraction technique uses a first threshold, and the second background subtraction technique uses a second threshold.

17. The method of claim 16, wherein the first threshold is greater than the second threshold.

18. The method of claim 14, wherein the group includes a central portion and a lower portion, further comprising:
using a third threshold for the central portion in conducting the second extraction; and
using a fourth threshold for the lower portion in conducting the second extraction, the fourth threshold being greater than the third threshold.

19. The method of claim 14, wherein the group includes a central portion, a boundary portion and a lower portion, further comprising:
using a third threshold for the central portion in conducting the second extraction;
using a fourth threshold for the boundary portion in conducting the second extraction; and
using a fifth threshold for the lower portion in conducting the second extraction, the fifth threshold being greater than the fourth threshold, and the fourth threshold being greater than the third threshold.

20. A method of image processing, the method comprising:
receiving an image frame including a plurality of pixels;
conducting a first background subtraction to identify foreground pixels related to a foreground object in the image frame and background pixels related to a background of the image frame;
identifying whether a region of the image frame includes a sufficient number of foreground pixels;
identifying whether a region including a sufficient number of foreground pixels includes a foreground object;
identifying whether in at least one region including a foreground object, a first region and a second region include the same foreground object;
conducting a second background subtraction for the group to identify whether a foreground pixel in the group is to be converted to a background pixel; and
updating one of the first and second background models with a first parameter, the first parameter satisfying:
$B'(P)=(1-a) B(P)+a I(P)$, if a pixel P is identified as a background pixel and is not located in a region including at least a portion of an object,
wherein $B'(P)$ is an updated value of a P-th pixel in one of the first or second background models, $I(P)$ is a value of the P-th pixel in the image, and $B(P)$ is a value of the P-th pixel in one of the first or second background models.

21. The method of claim 20 further comprising establishing a first background model for the first background subtraction and a second background model from the second background subtraction.

22. The method of claim 21, wherein the first background model includes a first threshold and the second background model includes a second threshold, the first threshold being greater than the second threshold.

23. The method of claim 20 further comprising:
assigning a score to a region including a foreground object; and
recording a position of the region including the foreground object.

24. The method of claim 20 further comprising updating one of the first or second background models with a second parameter, the second parameter satisfying:
wherein $B'(P)$ is an updated value of a P-th pixel in one of the first or and second background models, $I(P)$ is a value of the P-th pixel in the image, and $B(P)$ is a value of the P-th pixel in one of the first or second background models.

25. The method of claim 20 further comprising updating one of the first or second background models with a third parameter, the third parameter satisfying:
$B'(P)=(1-y)B(P)+y I(P)$, if a pixel P is identified as a foreground pixel,
wherein $B'(P)$ is an updated value of a P-th pixel in one of the first or second background models, $I(P)$ is a value of the P-th pixel in the image, and $B(P)$ is a value of the P-th pixel in one of the first or second background models.

* * * * *

UNITED STATES PATENT AND TRADEMARK OFFICE
CERTIFICATE OF CORRECTION

| | | |
|---|---|---|
| PATENT NO. | : 7,929,729 B2 | Page 1 of 1 |
| APPLICATION NO. | : 11/695573 | |
| DATED | : April 19, 2011 | |
| INVENTOR(S) | : Huang et al. | |

It is certified that error appears in the above-identified patent and that said Letters Patent is hereby corrected as shown below:

Column 10,

Line 15, "claim ," should read --claim 1,--.

Column 12,

Line 36, "first or and second" should read --first or second--.

Signed and Sealed this
Third Day of July, 2012

David J. Kappos
*Director of the United States Patent and Trademark Office*